United States Patent [19]

Aoki et al.

[11] Patent Number: 4,942,787

[45] Date of Patent: Jul. 24, 1990

[54] APPARATUS FOR AND METHOD OF CONTROLLING HYDRAULIC CLUTCH OPERATION IN AN AUTOMATIC TRANSMISSION

[75] Inventors: Takashi Aoki; Satoshi Terayama, Tokyo; Yoshihisa Iwaki, Saitama; Noboru Sekine, Saitama; Hiroyuki Shimada, Saitama; Nobuo Takemasa, Saitama; Junichi Miyake, Saitama, all of Japan

[73] Assignee: Honda Giken Kogyo Kabushiki Kaisha, Tokyo, Japan

[21] Appl. No.: 318,128

[22] Filed: Mar. 2, 1989

[30] Foreign Application Priority Data

Mar. 3, 1988 [JP] Japan ............................ 63-50337
Mar. 3, 1988 [JP] Japan ............................ 63-50338

[51] Int. Cl.$^5$ .................................. B60K 41/06
[52] U.S. Cl. ............................. 74/867; 192/109 F
[58] Field of Search .............. 74/867, 868; 192/109 F, 192/30 W, 3.58, 103 F

[56] References Cited

U.S. PATENT DOCUMENTS

| | | | |
|---|---|---|---|
| 3,722,646 | 3/1973 | Oguma | 192/109 F |
| 3,905,459 | 9/1975 | Liebich | 192/109 F |
| 3,946,760 | 3/1976 | Murakami et al. | 192/109 F |
| 3,964,372 | 6/1976 | Chattergea | 192/109 F X |
| 4,000,795 | 1/1977 | Patton | 192/109 F |
| 4,086,994 | 5/1978 | Hirosawa et al. | 192/109 F |
| 4,138,004 | 2/1979 | Horsch | 192/109 F |
| 4,139,610 | 1/1979 | Chatterjea | 192/109 F X |
| 4,289,221 | 9/1981 | Chambers et al. | 192/109 F X |
| 4,629,045 | 12/1986 | Kasai | 192/0.052 |
| 4,674,613 | 6/1987 | Sikorski | 192/52 |
| 4,718,525 | 1/1988 | Yamaguchi | 192/109 F X |

FOREIGN PATENT DOCUMENTS

| | | |
|---|---|---|
| 8203433 | 10/1982 | European Pat. Off. . |
| 2066919 | 7/1981 | United Kingdom . |
| 2080909 | 2/1982 | United Kingdom . |

Primary Examiner—Dwight Diehl
Attorney, Agent, or Firm—Lyon & Lyon

[57] ABSTRACT

A controller for an automatic transmission hydraulic clutch includes a hydraulic clutch engaged by hydraulic pressure, a hydraulic pressure control valve for regulating the hydraulic pressure, and a detector for detecting a condition immediately before engagement of the hydraulic clutch based upon a change in the hydraulic pressure. A timing controller adjusts timing to change a control force in the hydraulic pressure control valve in response to detection of a condition immediately before engagement of the clutch.

13 Claims, 8 Drawing Sheets

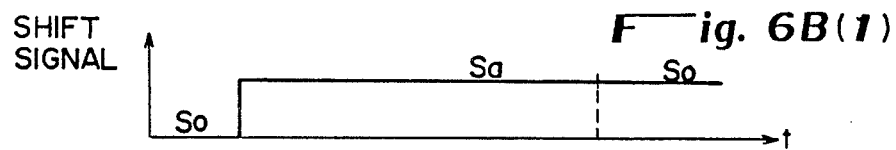
Fig. 6B(1)
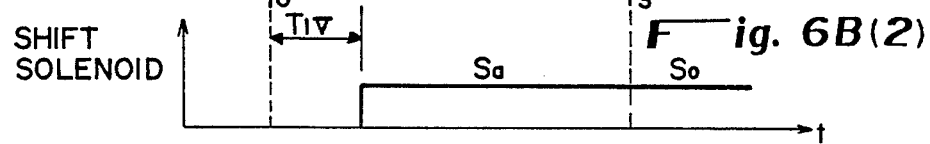
Fig. 6B(2)
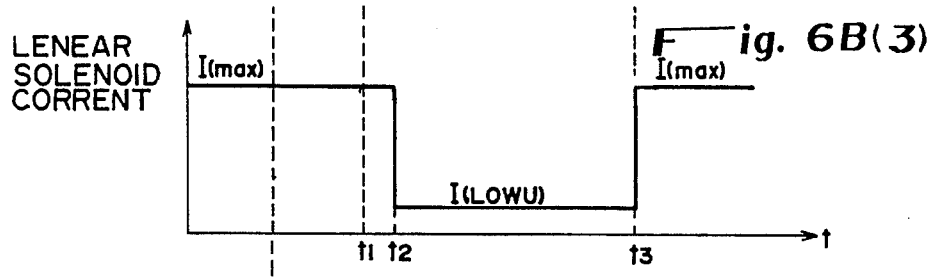
Fig. 6B(3)
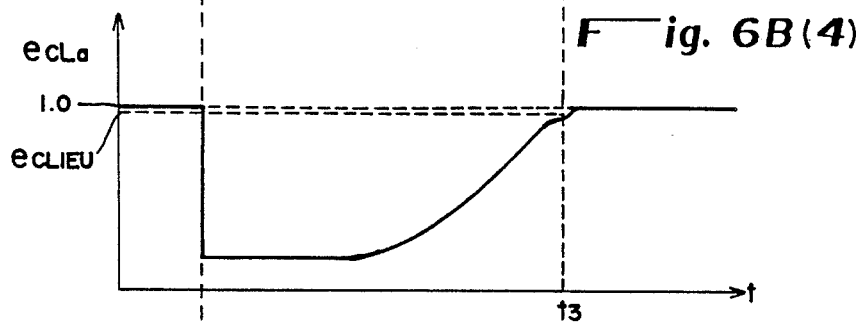
Fig. 6B(4)
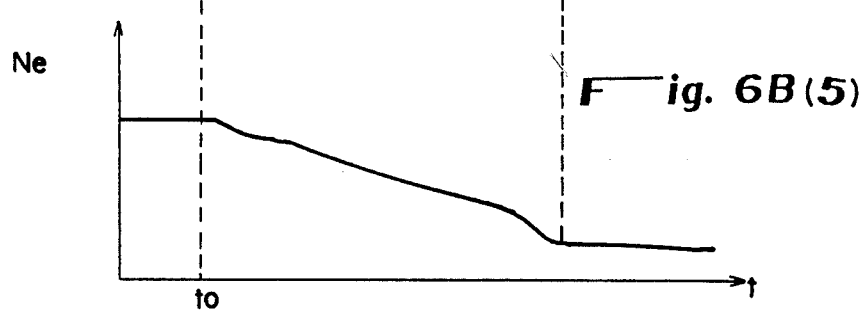
Fig. 6B(5)

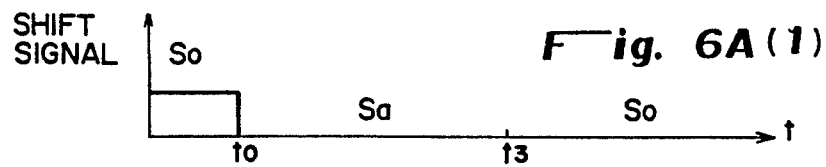
Fig. 6A(1)
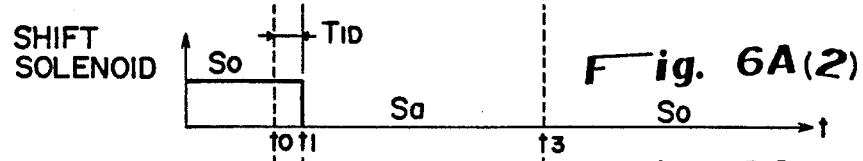
Fig. 6A(2)
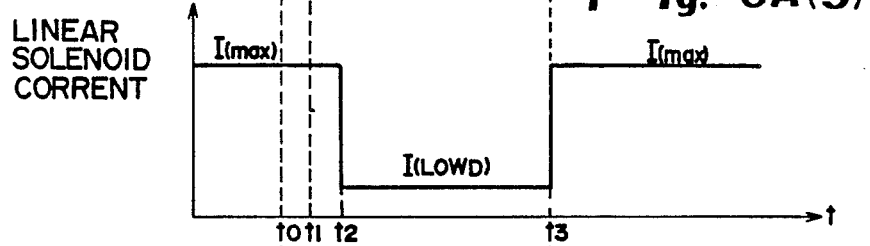
Fig. 6A(3)
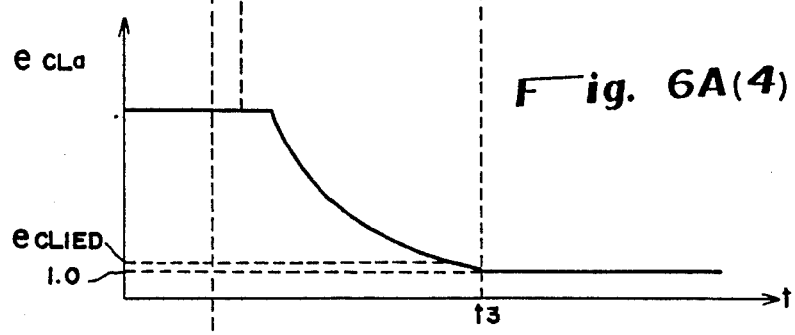
Fig. 6A(4)
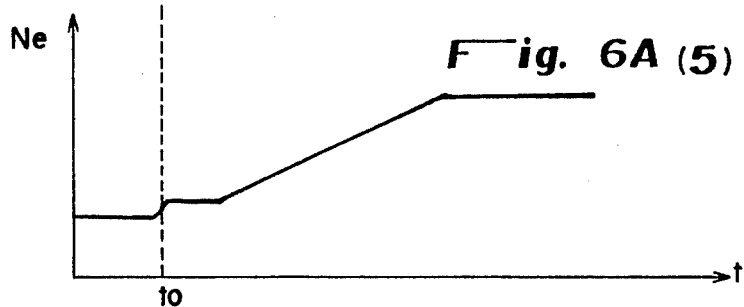
Fig. 6A(5)

APPARATUS FOR AND METHOD OF CONTROLLING HYDRAULIC CLUTCH OPERATION IN AN AUTOMATIC TRANSMISSION

BACKGROUND OF THE INVENTION

The invention relates to automatic transmissions for carrying out automatic shifting by switching power transmission lines, which may be in turn controlled by the operation of hydraulic clutches.

Automatic transmissions are so constituted as to obtain desired driving characteristics by automatically changing their speed ratios in accordance with the driving conditions. In order to attain this purpose, it is customary to provide a shift map composed of upshifting and downshifting lines for each speed range, the lines being established in relation to the vehicle speed and the engine power output, and to control the automatic transmission to shift the speed ranges according to the shifting map dependent on the changes of traveling states as indicated on the shift map. One example of such shifting control is disclosed in Japanese Laid-Open Patent Publication No. 61-189354, for example.

Hydraulic clutches used for shift control are controlled by supplying or discharging working fluid of a given pressure, and have been widely used for setting a speed in an automatic transmission, as seen in Japanese Patent Publication 52(1977)-21131.

In changing the speed in an automatic transmission, the hydraulic pressure in an hydraulic chamber of an engaging hydraulic clutch (hereinafter referred to as "pre-shift clutch") is discharged into a drain and at the same time fluid of the controlling pressure is fed into the hydraulic chamber of the hydraulic clutch for a gear train to be set up (hereinafter referred to as "post-shift clutch"). The changes in hydraulic pressure in the pre-shift and the post-shift clutches may be illustrated as in FIG. 8. In this figure a shift is started at time $t_1$. The hydraulic pressure in the hydraulic chamber of the pre-shift clutch rapidly drops from time $t_1$, although it exhibits a plateau pressure for some time owing to the functions of the accumulator, orifice control valve, and the like. On the other hand, the pressure in the hydraulic chamber of the post-shift clutch is rapidly stepped up to $P_2$ at time $t_2$ after it is maintained at $P_1$ from time $t_1$ to $t_2$; between time $t_2$ and $t_3$ retained on a plateau gently going up from $P_2$ to $P_3$; and increased up to the predetermined clutch pressure $P_L$ at the end of the time interval between $t_3$ and $t_4$. Such hydraulic pressure control is exercised to ensure smooth engagement of the post-shift clutch so that the shift shock is reduced, for which the change in hydraulic pressure has been conventionally obtained by the accumulator disposed in the hydraulic line supplying the fluid to the post-clutch.

In FIG. 8, the hydraulic pressure change in the post-shift clutch (line A) from time $t_1$ to $t_2$ indicates the pressure change observed over the period from the time that the piston of the post-shift hydraulic clutch begins to move to the time that the piston actually begins to push the clutch plate, i.e. the period required for the piston to move the clutch clearance. Since the motion of the piston during this period is dead stroke and the piston moves without doing any work, the hydraulic pressure in the hydraulic chamber supplies a low pressure needed for the motion, as exhibited in the time interval between $t_1$ to $t_2$ in the Figure.

Because of this, although the period actually required for the hydraulic clutch to carry out the shifting is from $t_2$ to $t_4$ shift time $T_2$ is prolonged by the dead stroke period ($t_1$ to $t_2$), causing a disadvantage that the driving feeling is degraded.

This problem may seem to be solved by maximizing the flow rate of the control fluid supplied to the post-clutch at almost the same time as the initiation of the shifting to minimize the dead stroke moving period of the piston. In this case, however, if the control fluid flow rate is maintained maximum, the rise in the hydraulic pressure over the period $t_1$ to $t_4$ of FIG. 8 is so great that it will cause a shift shock. Thus, it is necessary to estimate the period of the dead stroke of the piston by the use of a timer, and reduce the amount of the control fluid to be supplied at the end of the period, so that the pressure change over the period $t_2$ to $t_4$ as shown in FIG. 8 may be obtained.

However, the dead stroke moving time ($t_1$ to $t_2$) is easily affected by the variation of the individual clutch clearances, so that the above estimated time for the dead stroke movement may well vary from one transmission to another. Therefore, with the timer for maximizing the amount of the supplying control fluid over the estimated period, the piston may move more than the dead stroke and press the post-shift clutch, which will result in a sudden engagement of the post-shift clutch and a disadvantageous shift shock.

In conventional transmission control for power on shift-down (i.e. shift down operation while depressing the accelerator pedal, e.g. kick-down) or for power-off shift-up (i.e. shifting up operation by releasing the accelerator pedal during driving), the pre-shift clutch (which has been so far engaged) is disengaged and thereafter the post-shift clutch (which is to be engaged in the shifting) is engaged when the input rotation becomes in synchronism with the output rotation. Such control has an advantage that the engagement is smooth since no inertial energy is then exchanged between the input and output shafts.

In the conventional control, however, the accuracy of the synchronization timing of the input and output rotations in the post-shift clutch is low, since the detection (determination) of the synchronization resorts to a timer or the relationship between the vehicle speed and the engine speed, which are affected with the fluid temperature individual variations, and slips in the torque converter or the fluid couplings. Inaccurate determination of the synchronization timing will lead to, for example, an earlier engagement of the post-shift clutch which causes a shift shock, or a delayed engagement of the post-shift clutch which cases an excessively rapid increase in engine speed or unplesant feelings.

Another problem is also involved in the conventional transmission control in which the synchronization timing of the input and output rotations is detected for the post-shift clutch and the working fluid is supplied to the post-shift clutch, in that the time of engagement of the clutch delays due to the fact that the clutch begins to engage only after the piston has moved the dead stroke distance. This drawback may be improved by giving a shift signal at a time earlier than the true synchronization time. However, a difficulty still remains that the dead stroke greatly differs for individual transmissions and accurate detection of the synchronization time in prior to the synchronization is not easy.

SUMMARY OF THE INVENTION

An object of the invention is to provide a control apparatus for a hydraulic clutch used with an automatic transmission, which has a short dead stroke moving period and hence a short shift period and is less affected by individual variations of the transmission.

Another object of the invention is to provide a method of controlling a hydraulic clutch in power-on shift-down or in power-off shift-up, with which not only the synchronization of the input and the output speeds may be accurately detected in the post-shift clutch but also the engagement of the clutch may be done without delay upon the detection.

An apparatus for controlling hydraulic clutch operation according to the present invention comprises a hydraulic pressure control valve which regulates operational hydraulic pressure by employing a control force, a hydraulic clutch operated by the operational hydraulic pressure supplied from the hydraulic pressure contol valve, detection means which can detect a condition immediately before engagement of the hydraulic clutch and control means to adjust operational timings of the hydraulic pressure control valve in response to a detection of the above condition by the detection means.

With the above hydraulic clutch control apparatus, as the piston of the clutch is detected to have completed the dead stroke movement and the pressure is detected to have exceeded the predetermined pressure by means of, for example, the hydraulic pressure detection switch, a signal is sent from the switch to the hydraulic control valve which begins to control the hydraulic pressure to be supplied to the hydraulic clutch. Therefore, in making minimum the dead stroke moving time of the piston, it is possible to maximize the flow rate of the control fluid supplied from the hydraulic control valve to the hydraulic clutch till the completion of the dead stroke movement. In other words, until the dead stroke movement is completed, the amount of the control fluid supply is maximized to quickly move the piston for engagement in the shortest time. In this case, the hydraulic pressure remains low even if a great amount of the control fluid is supplied during the dead stroke movement, since the piston receives no reactive force then. However, as the stroke is finished and the piston beings to push the clutch plate, the hydraulic pressure increase rapidly, which is detected by the hydraulic pressure detection swtich. Upon receiving the signal from the switch indicative of the detection, the hydraulic pressure valve starts to control the hydraulic pressure required to engage the hydraulic clutch.

In the control method according to the present invention, the input to output speed ratio (=output speed/input speed) is detected by detecting the speeds of the input rotational member and the output rotational member of the hydraulic clutch, and the synchronization of the input and output shafts of the post-shift hydraulic clutch during shifting is detected by detecting the condition that the input to output ratio is about 1.0. In a power-on shift-down or power-off shift-up, the control force of the hydraulic control valve is maximized after the initiation of the shifting until the time just before the engagement so that the flow rate of the control fluid supplied to the hydraulic clutch is maximized, and then the hydraulic pressure is maintained at a value a little lower than that of the engagement starting pressure. The hydraulic pressure is adapted to increase to the predetermined value required for the engagement when the synchronization is detected.

By undergoing the above clutch control in the automatic transmission, when, for example, an shift signal based on the shift map is given in the power-on shift-down or power-off shift-up, the hydraulic fluid supplied to the pre-shift hydraulic clutch is reduced so that the pre-shift clutch is disengaged. In the post-shift clutch, the flow rate of the hydraulic fluid supplied from the hydraulic control valve is maximum at the beginning, allowing the piston of the clutch trip the dead stroke very quickly. Upon the completion of the dead stroke movement, the pressure of the fluid is raised to have the clutch engaged. The rise to the hydraulic pressure just before the engagement is detected. At the same time when the rise is detected, the hydraulic pressure is reduced to the level a little lower than the engagement starting pressure to maintain the clutch in pre-engaging condition. Then, the clutch is engaged when the input and output speeds are synchronized (i.e. equalized) in the post-clutch by increasing the hydraulic pressure to the predetermined engaging pressure. In this case, since the input to output speed ratio is directly detected by detecting the input and output rotational members of the post-clutch, an accurate detection of the synchronization timing is possible. Since the post-shift clutch has been in the pre-engaging condition before the synchronization, it is immediately engaged as the hydraulic pressure supplied to the post-clutch is increased, so that the post-shift clutch engagement is accurately controlled without delay upon the detection of the synchronization mentioned above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein:

FIGS. 6A(1-5) and 6B(1-5) are graphs showing the signals, input to output speed ratio, engine speed, etc., that appear in the control following the above flowchart.

DESCRIPTION OF THE PREFERRED EMBODIMENTS

Figure 1:
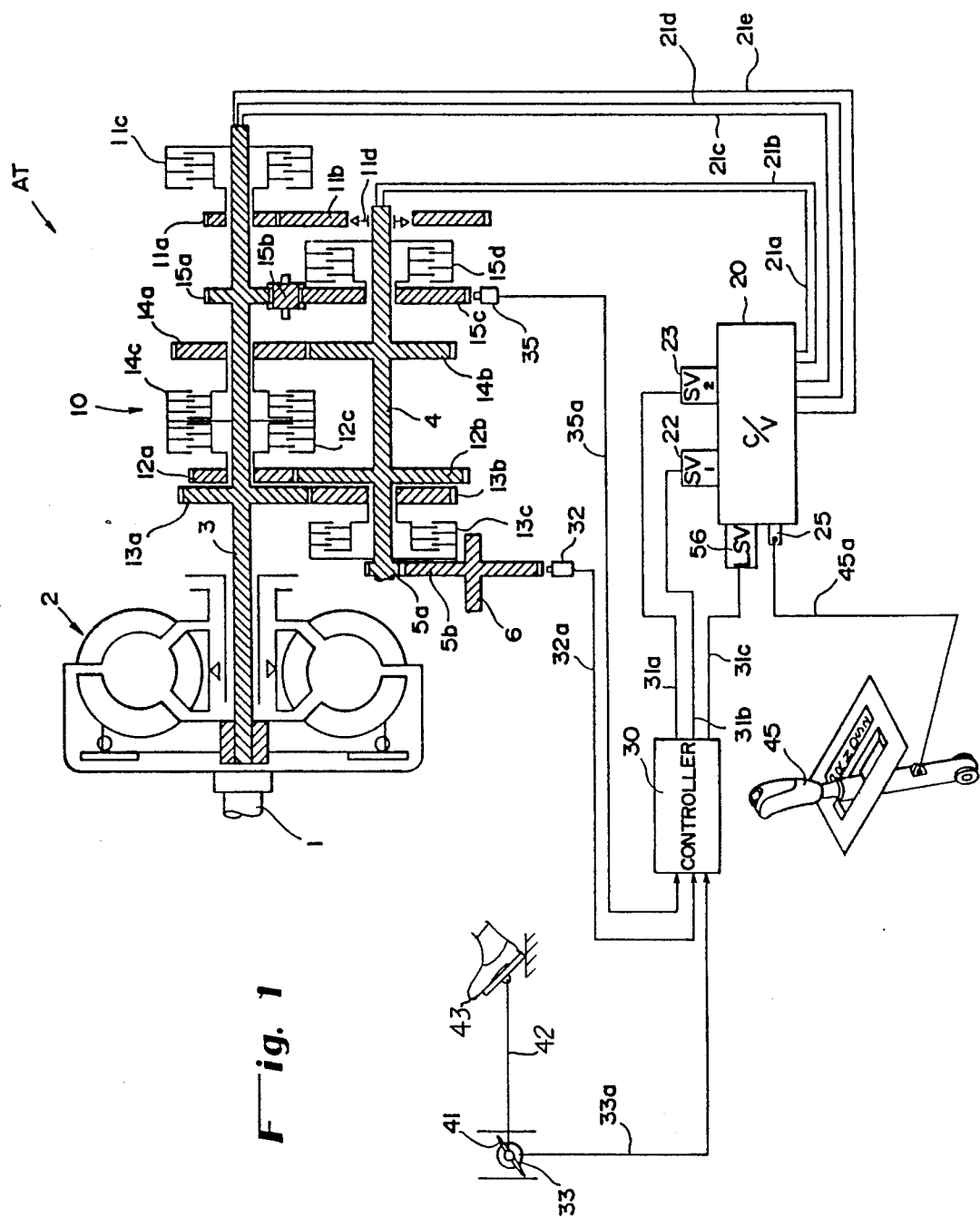
FIG. 1 is a schematic view of an automatic transmission.

FIG. 1 is an outline illustrating the constitution of an automatic transmission. In this transmission AT, the engine power output is transmitted from the engine shaft 1 to the output shaft 6 through a torque converter 2 and the speed reduction mechanism 10 having a multiplicity of gear trains by which the speed is changed. Specifically, the output power of the torque converter 2 is given to the input shaft 3. Then, it is transmitted to the counter shaft 4 arranged in parallel with the input shaft 3 after it is changed in speed by means of one of five gear trains disposed between the input shaft 3 and the counter shaft 4. The output power is further transmitted to the output shaft 6 through output gear trains 5a and 5b disposed between the counter shaft 4 and the output shaft 6.

The above five gear trains disposed between the input shaft 3 and the counter shaft 4 include a first speed gear trains 11a and 11b, a second speed gear train 12a and 12b, a third speed gear 113a and 13b, a fourth speed gear train 4a and 14b, and a reverse speed gear train 15a, 15b and 15c. The gear trains are each provided with hydraulically operable clutches 11c, 12c, 13c, 14c and 15d, respectively, for transmitting the power through them. The first speed gear 11b is provided with a one-way clutch 11d. Thus, by selectively operating one of these five gears, desired speed transmission may be achieved.

The five hydraulic clutches 11c through 15d mentioned above are selectively operated by the pressurized hydraulic fluid supplied from a hydraulic control valve 20 through hydraulic lines 21a, through 21e.

The operation of the hydraulic control valve 20 is controlled in accordance with the operations of a manual valve 25 which is connected to a shift lever 45 by means of a wire 45a, of two solenoid valves 22 23, and of a linear solenoid valve (clutch pressure control valve) 56.

The solenoid valves 22, 23 are turned on and off in correspondence with operation signals sent from a controller 30 via the signal lines 31a and 31b. The linear solenoid valve 56 is operated by signals sent from the controller 30 via the signal line 31c. The controller 30 is provided with a signal indicative of the rotational speed of the input speed of the hydraulic clutch detected by a first speed sensor 35 based on the rotation of the reverse gear 15c through the line 35a, a signal indicative of the output speed of the hydraulic clutch detected by a second sensor 32 based on the rotation of the output gear 5b via a signal line 32a, and a throttle opening signal indicative of the throttle opening of an engine throttle 41 detected by a throttle opening sensor 33 via a signal line 33a. The throttle 41 is connected with a throttle pedal 43 via a wire 42, so that the degree of depression of the throttle pedal may be detected by detecting the throttle opening.

The shift control in the transmission constituted as above is now described.

The shift control may be carried out in response to a shift lever 45 and according to the shift range set up by a manual valve 25 in the hydraulic control valve 20. Possible shift ranges are, for example, P, R, N, D, S, and 2. In P and N range, the hydraulic pressure clutch 11c through 15d are in non-engaged neutral state. In R range, the reverse hydraulic clutch 15d is engaged to establish a reverse range. In D, S, and 2 range, the shift control according to the shift map is carried out.

Figure 7:
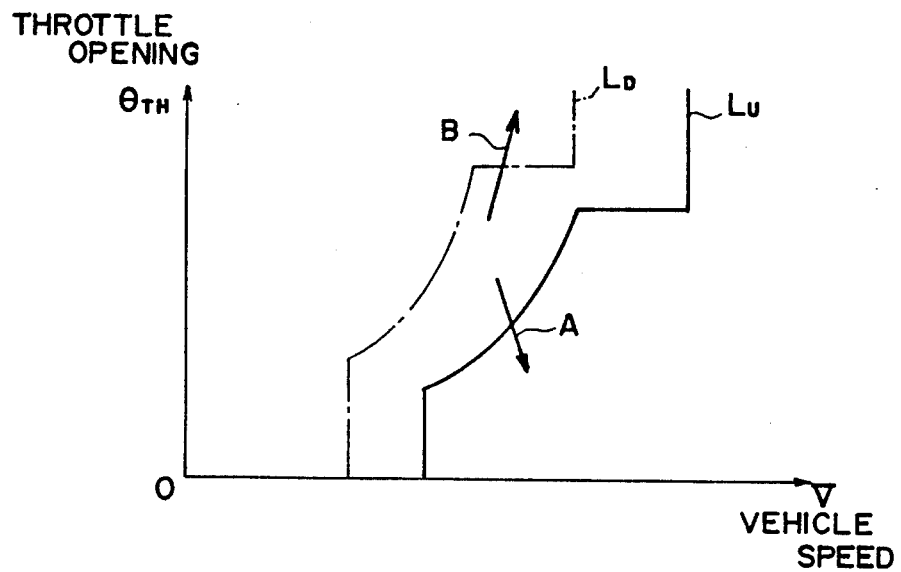
FIG. 7 is a graphical representation of the shift map used in the shift control.
Figure 8:
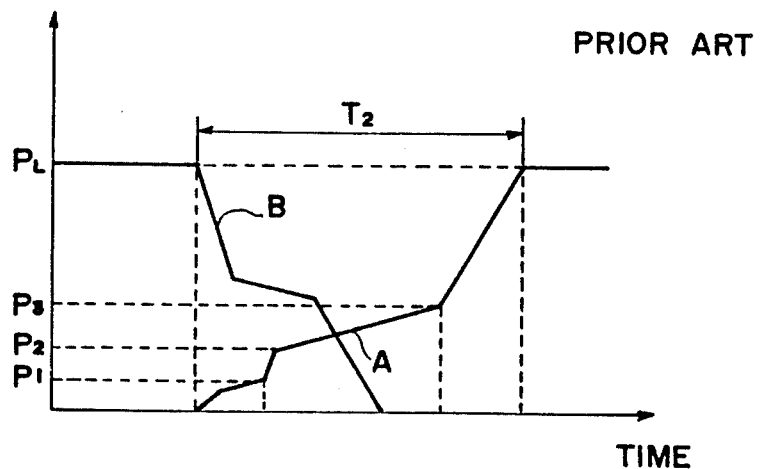
FIG. 8 is a graph showing the change in the control pressure in the hydraulic clutch under conventional transmission control.

The shift map has a shift-up line $L_U$ and a shift-down line $L_D$ as shown in FIG. 7 for which the throttle opening $\theta_{TH}$ and the vehicle speed V are taken on the axis of ordinates and abscissas, respectively. A shift-up is conducted when the point representing traveling state determined by the engine throttle opening (amount of depression of the accelerator pedal) and the vehicle speed crosses the shift-up line $L_U$ to the right. A shift-down is conducted when the point crosses the shift-down line $K_D$ to the left. It should be understood that although only one shift-up line and one shift-down line are shown in FIG. 7, there are in actual a multiplicity of lines corresponding to the number of speed ranges.

The power-on shift-down mentioned above refers to a case in which the accelerator pedal is depressed during driving to make a shift-down, crossing on the shift map the shift-down line $L_D$ from the up-region (right region) to down region (left region) as indicated by the arrow B. On the other hand, the power-off shift-up refers to a case in which the accelerator pedal is released during driving, crossing the shift-up line from the down region to the up region as indicated by the arrow A.

When the point crosses the shift-up line or shift-down line on the shift map, an operation signal is supplied from the controller 30 to the solenoid valves 22, 23 via signal lines 31a, 31b, which makes the control valve 20 operate so that supplying or discharging the hydraulic pressure to or from each of the hydraulic clutches 11c through 15d, yielding a shift-up or shift-down.

The control valve 20 will be described below with reference to FIG. 2.

In the control valve 20, the operational fluid supplied by the pump 8 from an oil sump 7 is led by a line 101 into a regulator valve 50 which functions to maintain the fluid at a predetermined line pressure. The fluid having the line pressure is led to the manual valve 25 through the line 110. Then the fluid is supplied, via various valves in the control valve 20, to a selected one of hydraulic clutches 11c, 12c, 13c, 14c, and 15d in accordance with changes in traveling states, thereby controlling the operation of the clutch.

These various valves in the control valve 20 will be described below. A relief valve 52 is disposed in the downstream of the regulator valve 50 and prevents the pressure of the fluid for lubrication supplied to the transmission through a line 102 from exceeding a predetermined pressure. A modulator valve 58 reduces the line pressure of the fluid supplied through a line 103 to a predetermined modulator pressure, and supplies this operating fluid having the modulator pressure to a lock-up clutch control circuit (not shown), via a line 104, to control the lock-up clutch in the torque converter 2. The fluid having modulator pressure is also supplied to a line 105 for shift control.

A manual valve 25 is operable in response to the shift lever manipulated by the driver, and may take either one of 6 positions, P, R, N, D, S, and 2. The fluid having the line pressure from the line 110 is selectively supplied to the lines in correspondence with the above positions.

A 1-2 shift valve 50, a 2-3 shift valve 52, and a 3-4 shift valve 54 are operated when the manual valve 25 is in either one of D, S, or 2 position by the action of the modulator pressure supplied in accordance with the ON-OFF actuation of the first and the second solenoid valves 22 and 23. These valves are provided for controlling the supply of the line pressure fluid to the first through the fourth clutches 11c, 12c, 13c, and 14c so that the shift control is carried out by operating the valves 50, 52, and 54.

A clutch pressure control valve 56, which corresponds to a hydraulic pressure control valve stated in the claims, is used for changing the pressure of the fluid to be supplied to the clutches 11c through 14c to a desirable pressure by means of a linear solenoid 56a, thereby preventing shift shocks during shifts. Also, the clutch capacity can be appropriately adjusted by changing the above pressure to a desirable pressure in correspondence with the engine throttle opening.

A first through a third orifice control valve 60, 66, and 68 are provided for relieving the hydraulic pressure in the pre-shift clutch during shifting, in a manner timed to the building up of the pressure in the post-shift clutch. The first orifice control valve 60 relieves the pressure in the hydraulic chamber of the third clutch 13c at the time of down-shift from the third to the second speed range and at the time of an up-shift from the third to the fourth speed range. The second orifice control valve 66 relieves the pressure in the hydraulic chamber of the second clutch 12c at the time of up-shift from the second to the third speed range or from the second to the fourth speed range. The third orifice control valve 68 relieves the pressure in the hydraulic chamber of the fourth clutch 14c at the time of down-shift from the fourth to the third speed range or from the fourth to the second speed range. It is noted that electric switches 65 and 69 are provided at the left ends of the first and the third orifice control valve 60 and 68, respectively. These switches detect the shifting and are switched on in response to the movement of the spools in the respective valves, in such a way that it is moved to the left against the spring force acting thereon as the control pressure supplied to the post-shift clutch exceeds a predetermined pressure. This leftward motion may be detected electrically.

The first clutch 11c and the reverse clutch 15d are connected with accumulators 90 and 95, respectively, which prevent the creation of shocks during shifting by moderating the hydraulic pressure change encountered in the operation of the clutches 11c and 15d. The second through the fourth speed clutches 12c-14c are connected with clutch pressure switches 80, 82, and 84, respectively. The motions of the spools of the switches 80, 82 and 84 are detected by electric switches 81, 83, and 85, respectively, to detect the starting up of the shifting operations of the clutches 12c-14c. Based on this detection, a starting time of controlling the line pressure by the clutch pressure control valve 56 is determined.

In the control valve 20 thus constituted, each of the above mentioned valves may be operated in response to the operation of the manual valve 25 initiated by the shift lever manipulation, and the ON-OFF operation of the solenoid valves 22 and 23, resulting in the selective supply of the line pressure to the corresponding one of the clutches 11c-15d for automatic shifting.

The operations of each valves in the shift from the third to the fourth speed range are described along with the change of the control pressure in the chambers of the third and fourth clutches 13c, 14c.

We start with traveling at the third speed range. In this case, the first solenoid valve 22 is OFF, and the communication between the line 107 and the drain is shut off so that the modulator pressure from the hydraulic line 105 acts on the hydraulic line 107. On the other hand, the second solenoid valve 23 is ON, and the hydraulic line 106 is communicating with the drain, so that the pressure inside the hydraulic line 106 is about zero. The spools of the 1-2 shift valve 50 and the 2-3 shift valve 52 move to the left, while the spool of the 3-4 shift valve 54 moves to the right. As a result the pressure of the fluid controlled by a clutch pressure control valve 56 to a predetermined line pressure $P_L$ is delivered to the third clutch 13c via the hydraulic lines 135, 134, 133, 132, and 131, keeping the third clutch 13c in engagement. It is noted that this control pressure $P_L$ acts on the third orifice control valves 66, 68 via the line 130 to move the spools of the valves 66, 68 to the left.

In the case above, the second and fourth clutches 12c, 14c are not engaged and the third clutch 13c is engaged, so that the power is transmitted through the third gear trains 13a, 13b. To note, the first clutch 11c is also in engagement, the power transmission through the first speed gear train 11a, 11b is not effected on account of the function of the one-way clutch 11d.

Next, shifting from the above condition to the fourth speed range is considered. This shift is carried out by turning OFF the first and second solenoid valve 22, 23, respectively, to derive from the hydraulic line 105 a modulator pressure in the hydraulic line 106 and 107. The spool of the 3-4 shift valve 54 which has been so far moved to the right is now moved to the left. Hence, the hydraulic control pressure which has been supplied so far from the clutch pressure control valve 56 to the third clutch 13c is now supplied to the fourth clutch 14c via the hydraulic lines 135, 134, 133, 132 and 141, and the supply to the third clutch 13c is shut off.

Figure 3:
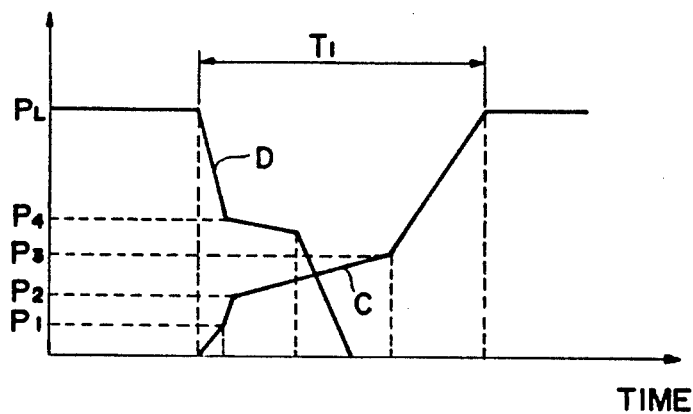
FIG. 3 is a graph showing a change in the clutch control pressure observed in the control of the transmission by the above control valve.

The pressure changes in the third clutch 13c and fourth clutch 14c encountered in such shifting from the third to the fourth speed is shown in FIG. 3 in which solid curves D and C show the pressure changes in the third clutch 13c and 14c, respectively, when the solenoid valve 22, 23 are both turned OFF at time $t_{11}$.

On account of shutting off the hydraulic pressure supply to the third clutch 13c, the pressure, which was $P_L$ before the shifting, rapidly drops to $P_4$ which balances with the reactive force of the spring 13d of the clutch. The pressure then gradually lowers as shown in the figure due to the control by the first orifice control valve 60 communicating therewith via the hydraulic line 136 and 137.

The hydraulic pressure in the fourth clutch 14c increases little at first due to the dead stroke involved in the clutch operable piston. However, in this example the clutch pressure control valve 56 is fully open by the maximum driving force of the solenoid 56a, so that the maximum flow rate of the control fluid is supplied through the lines 135, 134, 133, 132, 141. Consequently, the operating piston is quickly moved, completing the dead stroke movement in a very short time by $t_{12}$.

As the dead stroke movement is completed, the piston begins to push the clutch plate and as a result the hydraulic pressure rises quickly. If this pressure exceeds a predetermined pressure $P_1$, the spool of the hydraulic detection switch 84 receiving this pressure via the line 140 is moved to the right in the figure. The arm of the electric switch 85 is pushed by the spool and turns ON the switch 85. The pressure rise in the fourth clutch 14c can be detected by this ON operation of the switch 85 when it exceeds a predetermined hydraulic pressure $P_1$. The detection of the pressure at time $t_{12}$ initiates the hydraulic pressure control by means of the clutch pressure control valve 56.

This pressure control is carried out as shown in the figure. Namely, after the pressure is quickly increased to $P_2$ at about $T_{12}$, it is gradually increased till $t_{13}$ along a plateau between them, and then increased quickly up to $P_L$ till $t_{14}$, thereby nondelaying and smooth shifting may be obtained. It should be noted that the pressure in the fourth clutch 14c is also supplied through a fluid line 142 to the first orifice control valve 60, the spool of which is moved to the left to drain the line 142 as the pressure in the fourth clutch 14c exceeds a predetermined pressure. In this example, such action of the spool takes place at time $t_{21}$, after which the pressure in the third clutch 13c rapidly drops.

As mentioned above, since the piston of the clutch is quickly moved over the dead stroke distance, the overall shifting time $T_1$ may be shortened by shortening the time required for this dead stroke movement ($t_{11}$ to $t_{12}$).

Although in the above embodiment the hydraulic pressure detection switch 84 (or alternative hydraulic pressure detection switch 80 or 82 for other shifts) is used as a switch for detecting the completion of the dead stroke movement of the clutch piston during shift, other means that can detect the control hydraulic pressure in the clutch may be used equally well, or alternatively the motion of the clutch piston may be detected directly to find the completion of the dead stroke movement. Further, in the orifice control valves 60, 66, and 68, the spools are adapted to be moved by the hydraulic pressure of the post-shift clutch, it is possible to have the hydraulic pressure set to the level suitable for detecting the completion of the above mentioned dead stroke movement so that the completion of the above mentioned dead stroke movement may be detected by detecting the motions of the spools of these orifice control valve 60, 66, 68 by electric switches 65, 69.

Since in the above embodiment the initiation timing of the hydraulic control may be regulated by detecting the hydraulic pressure supplied to the hydraulic clutch exceeding a predetermined pressure, it is possible to make the amount of the control fluid supplied from the hydraulic control valve to the hydraulic clutch maximized until the dead stroke movement of the clutch piston is completed and the control pressure reaches the predetermined pressure, so as to have the dead stroke movement done quickly, and thereafter to start the hydraulic control of the shifting. This makes the shifting time corresponding to the dead stroke short and hence the over-all shift time short, providing favorable shift control having a good response. In spite of the fact that the shifting time corresponding to the dead stroke not only varies much with individual transmisssions but also changes with time, it is possible to suppress the resulting fluctuations in the shifting time by reducing the time for the dead stroke movement.

Figure 4:
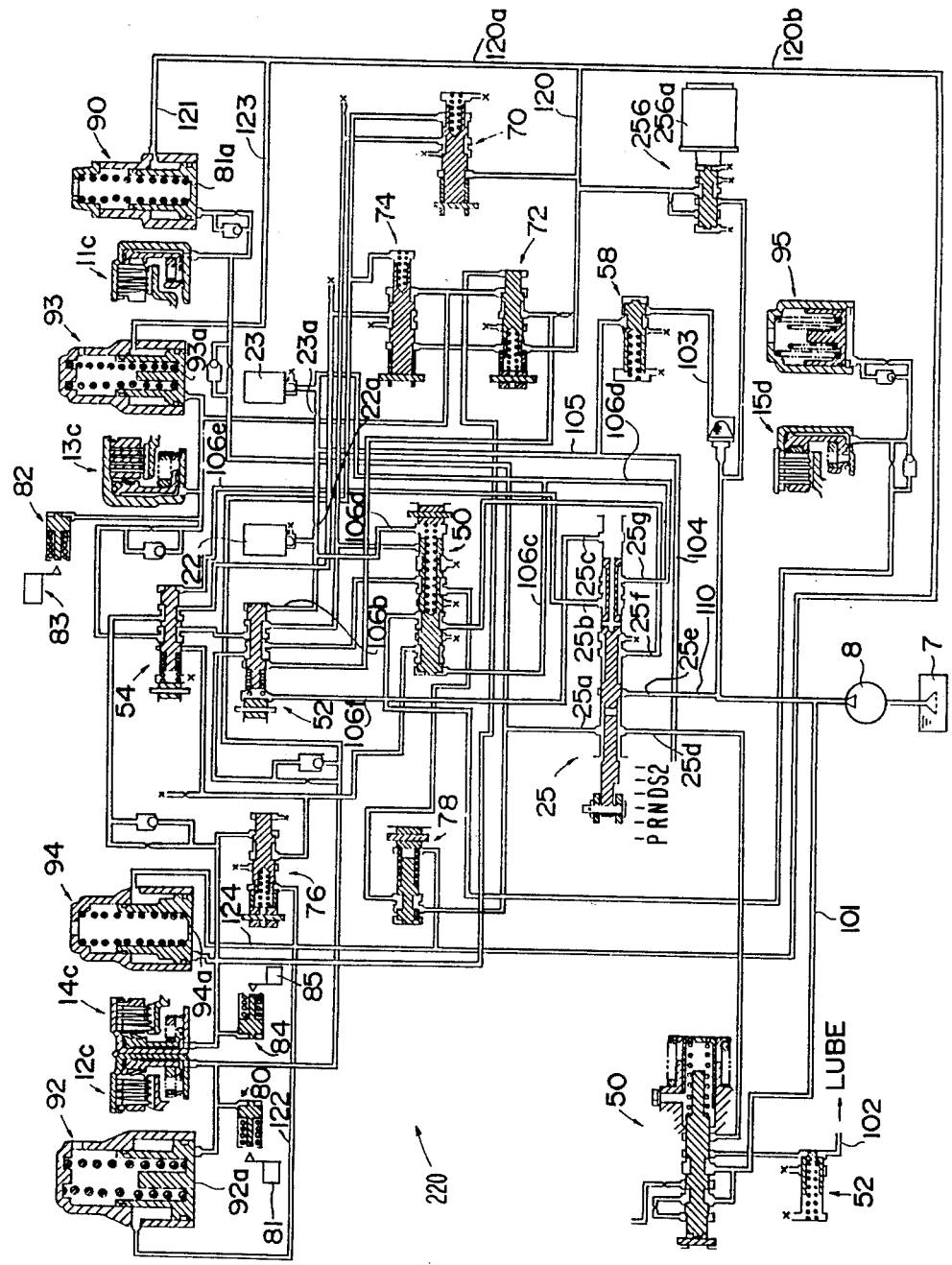
FIG. 4 is an alternative hydraulic circuit of the hydraulic control valve for shift control in accordance with the invention.

Next, referring to the FIG. 4, other embodiments of the hydraulic control valves are described below. A pump 8, an oil sump 7, a regulator valve 50, a relief valve 52, manual valve 25, a modulator valve 58, 1-2 shift valve 50, 2-3 shift valve 52 and 3-4 shift valve 54 for the control valve 220 are the same with those in FIG. 2, and further description of them is not repeated here.

Fluid lines 106a, 106b connected with a first solenoid valve 22 and also with a fluid line 105 via an orifice 22a. When the first solenoid valve 22 is electrically turned off, the drain port thereof is shut off, and the lines 106a, 106b is supplied from the line 105 with a working fluid having a modulator pressure. When the solenoid valve 22 is electrically turned on, the drain port is opened so that the pressure in the lines 106a, 106b become nearly zero. Lines 106c through 106f are connected with a second solenoid valve 23 and with the line 105 via the orifice 23a. When the second solenoid valve 23 is electrically turned off, the drain port thereof is shut off and the lines 106c through 106f are supplied from the line 105 with the working fluid having a modulator pressure. When the above valve 23 is electrically turned on, the drain port is opened to make the pressure in the lines 106c through 106f nearly zero.

The line 106a is connected to the right end of the 1-2 shift valve 50, the line 106b to the right end of the 2-3 shift valve 52, the line 106c to the left end of the 1-2 shift valve 50, the line 106e to the right end of the 3-4 shift valve 52, the line 106f to the left end of the 2-3 shift valve 52. The line 106e and 106f are also connected with the second solenoid valve 23 through the manual valve 25 and the line 106d. Hence, through ON-OFF controls of the first and the second solenoid valves 22 and 23, which controls supply and discharge of the modulator pressure supplied from the lines 106a through 106f, operational controls of the 1-2, 2-3, 3-4 shift valves 50, 52, 54, respectively, may be carried out. Therefore, by selectively supplying the line pressure from the line 110 to the hydraulic clutch 11c, 12c, 13c, 14c via the manual valve 25, a desirable transmission shift may be fulfilled.

The control valve 220 comprises a first through a fourth orifice control valve 70, 72, 74 and 76, with which, at the time of a shift, the pressure relief in the hydraulic chamber of the pre-shift clutch may be timed to the rise of the hydraulic pressure in the hydraulic chamber of the post-shift clutch. The relief timing of the hydraulic pressure in the third speed clutch during shifting from the third to the second speed is done with the first orifice control valve 70; the relief timing of the hydraulic pressure in the second speed clutch during shifting from the second to the third speed or from the second to the fourth speed is done with the second orifice control valve 72; the relief timing of the hydraulic pressure in the fourth speed clutch during shifting from the fourth to the third speed or from the fourth to the second speed is done with the third orifice control valve 74; the relief timing of the hydraulic pressure in the third speed clutch during shifting from the third to the fouth speed is done with the first orifice control valve 76.

Accumulators 91, 92, 93, and 94 each having pressure-receiving chambers communicated with the corresponding hydraulic clutches 11c, 12c, 13c, 14c are provided. The fluid lines 121, 122, 123, 124 are connected with respective back pressure chambers which are arranged in opposition to the pressure receiving chambers of the accumulators and across the piston members 91a, 92a, 93a and 94a. These fluid lines are also connected with a linear solenoid valve 256 via the fluid line 120a, 120b, and 120.

The linear solenoid valve 256 has a linear solenoid 256a, which is controlled by the electric current supplied thereto, thereby enabling the hydraulic pressure control supplied to the fluid line 120. Thus, by controlling the electric current to the linear solenoid 256a, the pressure in the back pressure chamber of the accumulators 91 through 94 may be controlled and so that the hydraulic pressure in the pressure chamber in the engaging clutch (post-shift clutch) may be controlled at will during shifting.

Figure 2:
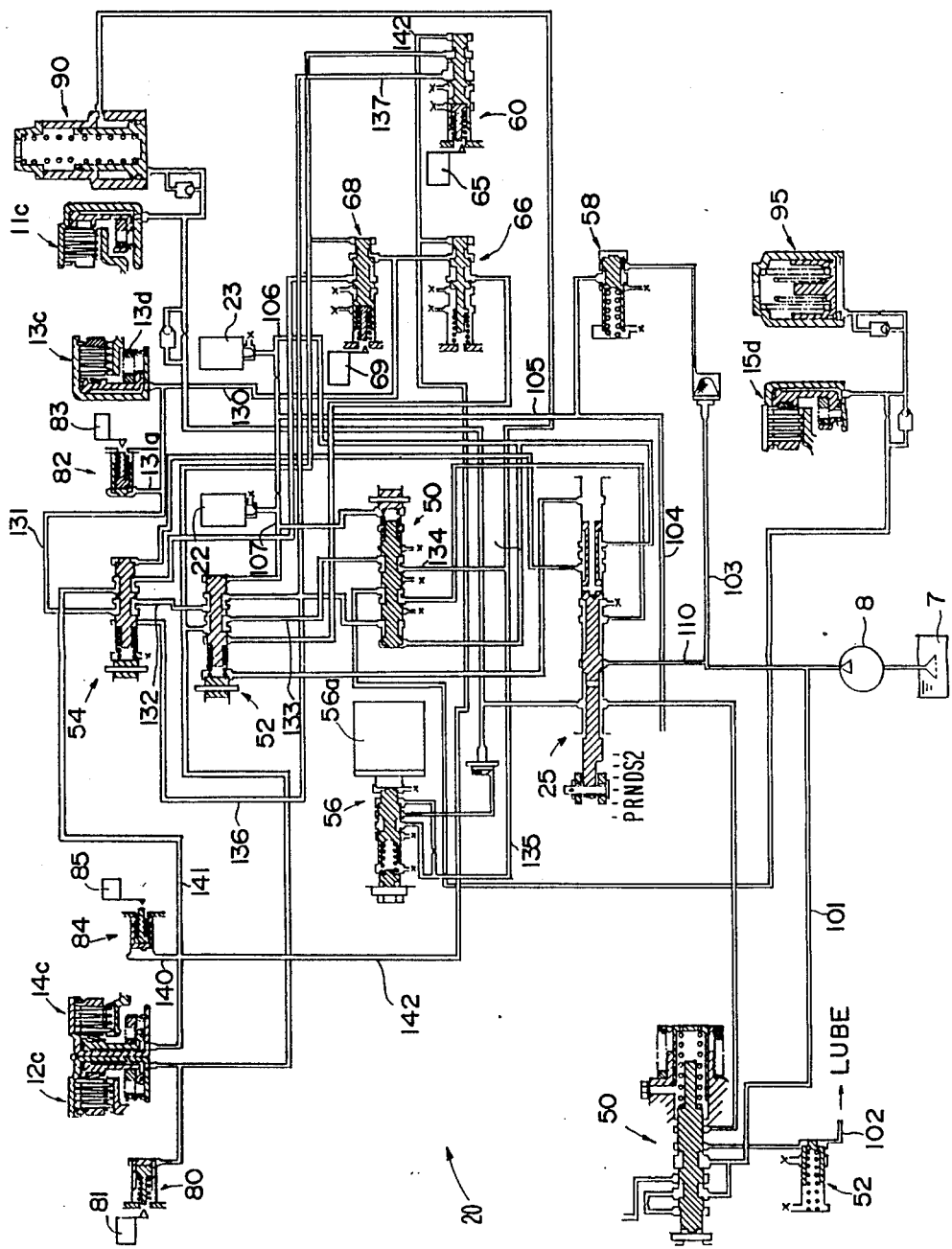
FIG. 2 is a hydraulic circuit of a control valve used in controlling the above automatic transmission.

The second through the fourth speed clutches are also provided with hydraulic pressure detection switches 80, 82, and 84, respectively just like shown in FIG. 2.

In the control valve 220 thus constituted, each of the above valves (other than the valve 22, 23, and 25) are controlled by the operation of the manual valve 25 actuated manually with the shift lever 45, and by the ON-OFF actuations of the solenoid valves 22 and 23, so as to provide selectively hydraulic line pressures to each of the clutches 11c through 15d suitable for the automatic shifting. Such operation have been well known in the art and therefore they are not further described here.

Figure 5:
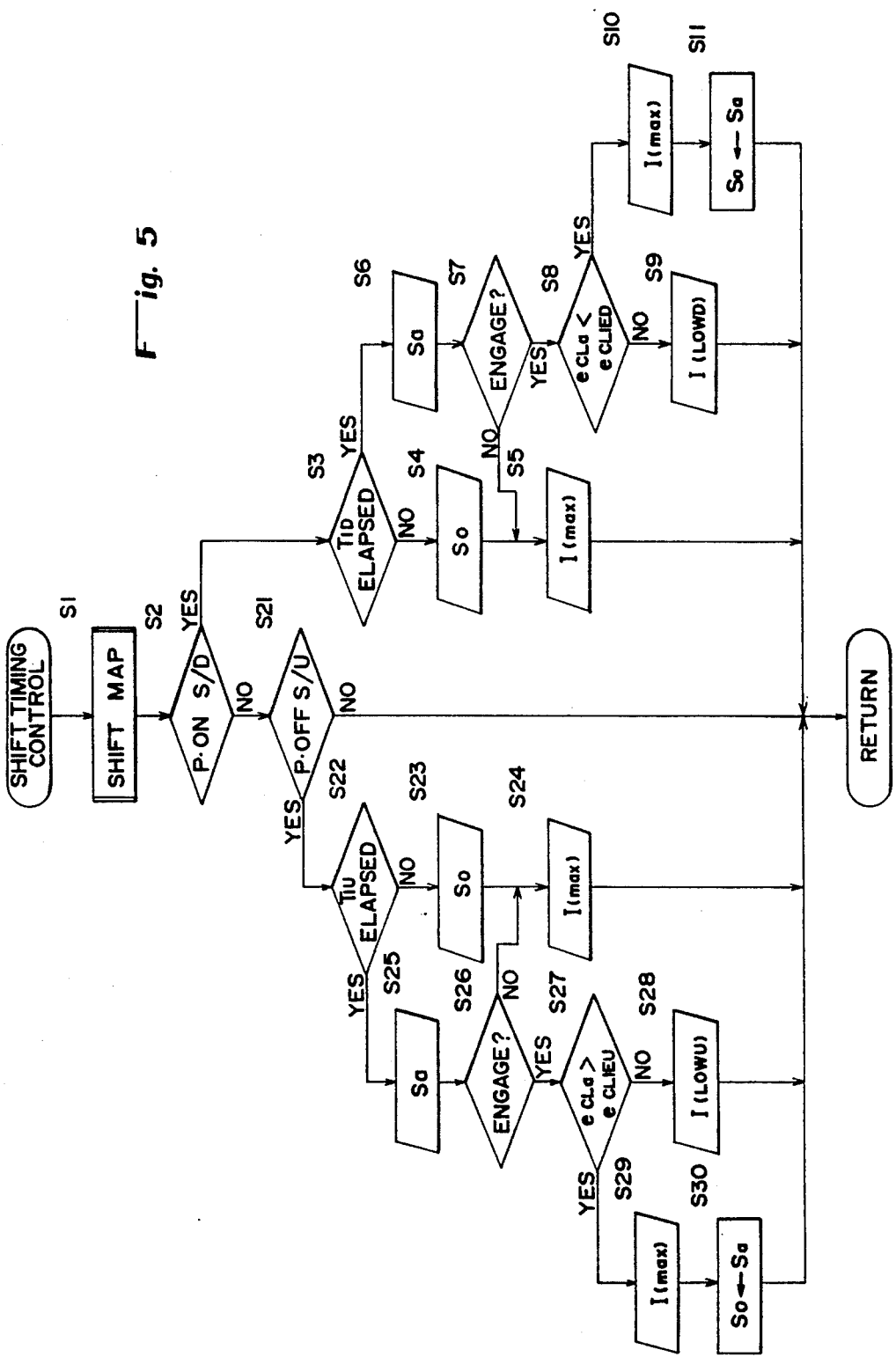
FIG. 5 is a flowchart of the control according to the invention.

Referring to the flowchart in FIG. 5, and the graphs in FIGS. 6A and 6B, control of the shifting in the power-on shift-down or power-off shift-up for the transmission above is now described.

In this control, the traveling state is determined on the shift map in S1, and a determination is made in step S2 whether the shift is a power-on shift-down, i.e. any change has taken place as shown by the arrow B in FIG. 7. If the traveling state change is found to be in a power-on shift-down, a shifting instruction is made to switch from the present speed range (pre-shifting range) S0 to an object speed range (post-shifting range) S1 (at time $t_0$ as shown in FIG. 6A). During a predetermined period of delay time $T_{1D}$ (step S3), signals $S_0$ are given to the solenoid valves 22, 23 to maintain the present speed range (step S4) and the electric current output to the linear solenoid 56a is maximized to I (max) (in step S5) so as to maintain at the maximum the fluid line pressure supplied to the present speed range clutch (pre-shifting clutch). The clutch is left engaged.

After the time $T_{1D}$ elapsed, a signal $S_a$ is output to the shift solenoids 22, 23 to shift down from the present speed range to the object speed range in step S6. Next, it is examined if the post-shift clutch is in a condition immediately before engagement (ion step S7). Whether the piston of the clutch has moved over the dead stroke and is just before the engagement or not can be detected by means of corresponding hydraulic pressure detection switches 81, 82, or 84. Until the piston becomes in a condition just before the engagement, the electric current to the linear solenoid 56a is maximized to I (max) (in step S5). Although the electric current remains at the maximum I (max), the working fluid supply to the present speed range clutch (pre-shift clutch) is shut off since a shifting signal $S_a$ is output from the shift solenoid, and fluid supply to the object speed range clutch is started. Since the electric current through the linear solenoid 56a is maximum, the fluid supply to the object speed range clutch is maximum, moving the piston of the clutch quickly toward engagement. The piston is moved quickly over the dead stroke distance. At a piston just before engagement, the hydraulic pressure is increased in the clutch, which is detected by the hydraulic pressure detection switches 81, 82, or 84.

When the object speed range clutch reaches the condition just before the engagement (at time $t_2$), a decision is made whether or not the input-output speed ratio $e_{cLa}$ (= output speed/input speed) is greater than a threshold value $e_{CLEID}$ which is a little greater than 1.0 (in step S8). The input-output ratio is obtained from the values detected by the first and the second speed sensors 35, 32 and calculated by the gear ratio of the gear train, i.e. 15c and 5b used for the detection through the post-shift clutch gears. At an early stage of the shift, the input-output speed ratio of the present speed range clutch is 1.0. On the other hand, the input speed of the object speed range clutch is smaller than the output speed, so that the input-output speed ratio $e_{CLa}$ is much greater than 1.0 for the object range clutch (see FIG. 6A). In this case the electric current output to the linear solenoid 56a is reduced in step S9 to a predetermined low current I (LOWD) (at time $t_2$).

Therefore, a low back pressure generated by the linear solenoid valve 56 in correspondence to the above low value I (LOW) is supplied to the back pressure chamber of the accumulator connected with the object speed range clutch. Since the accelerator pedal has been depressed, the engine speed Ne is accordingly increased as shown in 6A. It has that the engine speed is a little increased at the time $t_0$, which is due to the fact that since the engine speed is increased at the time the accelerator pedal was depressed (i.e. time of power-on), the slip of the torque converter has grown. On account of this, it is not desirable to calculated from the engine speed the input speed of the clutch. However, the speed detection in this embodiment is accurate, since the input speed is calculated from the gear speed of the gear 15c connected mechanically on the input side of the clutch and from the gear ratio of the gears involved in the shifting.

As the engine speed is increased as mentioned above, the input speed of the object speed range clutch is increased as well, so that the input-output speed ratio $e_{CLa}$ gradually approaches 1.0. When the input-output speed ratio becomes smaller than the threshold value $e_{CLIED}$ which is set a little greater than 1.0 as a precaution to allow some variation, steps proceeds from S8 to S10 in which the maximum electric current I (max) is passed through the linear solenoid 56, so that the hydraulic pressure supplied in the back pressure chamber of the accumulator connected with the object speed range clutch is rapidly increased, and so is the pressure in the hydraulic pressure chamber of the object range clutch, thereby engaging the clutch to complete the shift (at time $t_3$).

It should be noted here that the magnitude of the electric current I(LOWD) supplied to the linear solenoid 56a is set so that the hydraulic chamber pressure, which is given in the object range clutch by the solenoid valve 56 having the linear solenoid 56 in the form of an accumulator back pressure, is a little lower than the engagement starting pressure of the object range clutch. Accordingly, the piston in the object range clutch is retained, during the time $t_2$ to $t_3$, in a condition immediately before engagement after it has moved the dead stroke distance against the return spring force under the hydraulic pressure which is a little lower than the engagement starting pressure, and hence at time $t_3$ at which the current output to the linear solenoid 56a is raised to I(max) the object range clutch may be engaged with little delay, providing smooth shift down.

As the power-on shift-down is finished at this moment, the shift instruction $S_a$ to the shift solenoid valve is switched to $S_0$ (in step S11), and the speed range after the above shift is taken as the present speed range to prepare for subsequent shift controls.

On the other hand, if the shift is judged not to be power-on shift-down in step S2, the control flow proceeds to step S21 where a decision is made whether or not the shift is power-off shift-up, i.e. whether the change as indicated by the arrow A in FIG. 7 has been taking place. If the shift is power-on shift-up, the shift instruction is switched from the present pre-shift one $S_0$ to the object post-shift one $S_1$ (at time $t_0$) as shown in FIG. 6B. Further, over a predetermined delay period $T_{1U}$ (step S22), a signal $S_0$ is given to the shift solenoid valve 22, 23 (step S23) instructing them to maintain the present speed range, and the present range clutch (pre-shift clutch) is retained in engagement by maximizing the electric current supplied to the linear solenoid 56a to I(max) during the period (step S24).

After the period $T_{1U}$ has elapsed (at time $t_1$), the control proceeds to step S25, where a signal $S_a$ is output to the shift solenoid to shift up the the speed range to the object speed range. In this case also, until the object range clutch reaches the condition immediately before the engagement, the electric current given to the linear solenoid 56a is retained to the maximum i(max) so that the dead stroke motion of the piston is quickly done (step S26, S24).

When the object range clutch reaches the condition just before the engagement, the control flow proceeds to step S27 where a decision is made whether or not the input-output speed ratio $e_{CLa}$ is smaller than a threshold value $e_{CLIEU}$ which is a little greater than 1.0. At an early stage of the shift the input-output speed ratio of the present range clutch is 1.0. On the other hand, the input speed of the object range clutch to which the clutch is shifted up is greater than the output speed, so that the input-output speed ratio $e_{CLa}$ is much smaller than 1.0 for the object range clutch (see FIG. 6B). In this case, the control flow proceeds to step S28 where the electric current output to the linear solenoid 56a is reduced to a predetermined low current I(LOWU) (at time $t_2$).

With this operation, the hydraulic pressure in the object range clutch is decreased to a level corresponding to the above low electric current I(LOWU). Since the accelerator pedal has been released, the engine speed Ne is accordingly decreased as shown in FIG. 6B. It is seen that the engine speed is a little decreased at the time $t_0$, which is similar to the above case, due to the fact that the slip of the torque converter has reduced since the engine speed is decreased by the release of the accelerator pedal.

As the engine speed is decreased as mentioned above, the input speed of the object range clutch is increased as well, so that the input-output speed ratio $e_{CLa}$ gradually approaches 1.0. When the input-output speed ratio becomes smaller than the threshold value $e_{CLIEU}$ which is set a little smaller than 1.0. as a precaution to allow some error the control flow proceeds from S27 to S29 in which the maximum electric current I(max) is passed through the linear solenoid 56, so that the hydraulic pressure supplied in the back pressure chamber of the accumulator connected with the object range clutch is rapidly increased, and so is the pressure in the hydraulic pressure chamber of the object range clutch, thereby engaging the clutch to complete the shift (at time $t_3$).

It should be noted in this case also that the magnitude of the electric current I(LOWD) supplied to the linear solenoid 56a is set so that the hydraulic chamber pressure, which is generated in the object range clutch as a result of the pressure regulation by the solenoid valve 56 having the linear solenoid 56a in response to the accumualtor back pressure, is a little lower than the engagement starting pressure of the object range clutch. Because of this, the piston in the object range clutch is retained in a condition immediately before engagement after it has moved the dead stroke distance against the return spring force under the hydraulic pressure little lower than the above engagement starting pressure. At time $t_3$ at which the current output to the linear solenoid 56a is raised to I(max), the object range clutch may be engaged with little delay, providing smooth shift up.

As the power-on shift-down is finished in this way, the shift instruction $S_a$ to the shift solenoid valve is replace by $S_0$ (in step S30), and the speed range after the above shift is taken as the present speed range to prepare for subsequent shift controls.

If the step S21 the shift is decided not to be power-off shift-up either, the control flow comes to an end.

Although the invention has been described by way of example for an embodiment using a linear solenoid valve for the control of working fluid pressure in the post-shift clutch during shifting, if should be understood that the invention is not limited to this, and that solenoid valves controlled by duty ratio signals, for example, may alternatively be used.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. An apparatus for controlling hydraulic clutch operation in an automatic transmission comprising:
   a hydraulic clutch operatively engaged by use of operational hydraulic pressure;
   a hydraulic pressure control valve for regulating the operational hydraulic pressure supplied to said hydraulic clutch in accordance with a control force;
   detection means for detecting a condition immediately before engagement in said hydraulic clutch based on a change in said operational hydraulic pressure; and
   control means for adjusting a timing to change said control force in said hydraulic pressure control valve in response to a detection of said condition immediately before engagement by said detection means.

2. An apparatus for controlling hydraulic clutch operation as defined in claim 1; wherein, when said hydraulic clutch is going to be engaged during shift, the control force employed on said hydraulic pressure control valve is set to maximum until said condition immediately before engagement is detected, and then said control force is reduced to an appropriate force for obtaining a specified operational hydraulic pressure.

3. An apparatus for controlling hydraulic clutch operation as defined in claim 1 or 2; wherein, said detection means includes a hydraulic pressure switch to detect a hydraulic pressure at which said hydraulic clutch is in a condition immediately before engagement.

4. An apparatus for controlling hydraulic clutch operation as defined in claim 1 or 2; wherein, said control force employed on said hydraulic pressure control valve is generated by a electric drive means, said detection means includes an electric pressure switch to detect a hydraulic pressure at which said hydraulic clutch is in a condition immediately before engagement, and said control means adjust operational timings of said hydraulic pressure control valve in response to electric signals sent from said electric pressure switch.

5. An apparatus for controlling hydraulic clutch operation as defined in claim 4; wherein, said electric drive means includes a linear solenoid.

detection means for detecting a condition immediately before engagement in said hydraulic clutch based on a change in said operational hydraulic pressure; and control means for adjusting a timing to change said control force in said hydraulic pressure control valve in response to a detection of said condition immediately before engagement by said detection means.

6. An apparatus for controlling hydraulic clutch operation in an automatic transmission, comprising:

a hydraulic pressure control valve which regulates operational hydraulic pressure by employing a control force, a hydraulic clutch operated by the use of the operational hydraulic pressure supplied from said hydraulic pressure control valve;

detection means which can detects a condition immediately before engagement of said hydraulic clutch; and control means to adjust operational timings of said hydraulic pressure control valve in response to a detection of said condition by said detection means wherein said control force employed on said hydraulic pressure control valve is generated by a electric drive means, said detection means includes an electric pressure switch to detect a hydraulic pressure at which said hydraulic clutch is in a condition immediately before engagement, and said control means adjust operational timings of said hydraulic pressure control valve in response to electric signals sent from said electric pressure switch.

7. An apparatus for controlling hydraulic clutch operation in an automatic transmission, comprising:

a hydraulic clutch operatively engaged by the use of operational hydraulic pressure;

an orifice provided in a hydraulic line through which operational hydraulic fluid is supplied to said hydraulic clutch;

an accumulator having a pressure receiving chamber being connected to said hydraulic clutch and a back-pressure chamber, hydraulic pressure in said pressure receiving chamber being determined in correspondence with hydraulic pressure in said back-pressure chamber;

a hydraulic pressure control valve for regulating control hydraulic pressure supplied to said back-pressure chamber in accordance with a control force;

detection means for detecting a condition immediately before engagement in said hydraulic clutch based on a change in said operational hydraulic pressure; and control means for adjusting a timing to change said control force in said hydraulic pressure control valve in response to a detection of said condition immediately before engagement by said detection means.

8. An apparatus for controlling hydraulic clutch operation as defined in claim 7 wherein, when said hydraulic clutch is going to be engaged during shift, the control force employed on said hydraulic pressure control valve is set to maximum until said condition immediately before engagement is detected, and then said control force is reduced to an appropriate force for obtaining a specified operational hydraulic pressure.

9. An apparatus for controlling hydraulic clutch operation as defined in claim 7 or 8 wherein said detection means includes hydraulic clutch is in a condition immediately before engagement.

10. An apparatus for controlling hydraulic clutch operation as defined in claim 7 or 8 wherein, said control force employed on said hydraulic pressure control valve is generated by a electric drive means, said detection means includes an electric pressure switch to detect a hydraulic pressure at which said hydraulic clutch is in a condition immediately before engagement, and said control means adjusts operational timings of said hydraulic pressure control valve in response to electric signals sent from said electric pressure switch.

11. An apparatus for controlling hydraulic clutch operation as defined in claim 10 wherein said electric drive means includes a linear solenoid.

12. A method of controlling hydraulic clutch operation in an automatic transmission, said hydraulic clutch operation being controlled by fluid of operational hydraulic pressure supplied from a hydraulic pressure control valve and said operational hydraulic pressure being regulated by said hydraulic pressure control valve in accordance with a control force employed on said control valve, comprising the steps of:

setting said control force to maximum until a condition immediately before engagement of post-shift hydraulic clutch is detected during shifting.

reducing said control force to a low valve immediately after detection of said condition, so that said operational hydraulic pressure is reduced to a pressure a little lower than engagement starting pressure at which said post-shift hydraulic clutch is kept in a condition immediately before engagement, and then increasing said control force to a specified valve when an input to output speed ratio in said post-shift clutch becomes approximately 1.0, so that said operational hydraulic pressure is increased to a specified pressure at which said post-shift hydraulic clutch is engaged.

13. A method of controlling hydraulic clutch operation in an automatic transmission, said hydraulic clutch operation being controlled by fluid of operational hydraulic pressure supplied from a hydraulic pressure control valve and said operational hydraulic pressure being regulated by said hydraulic pressure control valve in accordance with a control force employed on said control valve, comprising the steps of:

setting said control force to maximum until a condition immediately before engagement of post-shift hydraulic clutch is detected during shifting, reducing said control force to a low value immediately after detection of said condition, so that said operational hydraulic pressure is reduced to a pressure a little lower than engagement starting pressure at which said post-shift hydraulic clutch is kept in a condition immediately before engagement, and then increasing said control force to a specified value when an input to output speed ratio in said post-shift clutch becomes approximately 1.0, so that said operational hydraulic pressure is increased to a specified pressure at which said post-shift hydraulic clutch is engaged.

\* \* \* \* \*